Aug. 21, 1962     C. T. WALTER     3,050,297
FLAME CURING MACHINE FOR CAN BODIES
Filed Nov. 24, 1959     7 Sheets-Sheet 1

INVENTOR.
CHARLES T. WALTER
ATTORNEYS

Aug. 21, 1962 C. T. WALTER 3,050,297
FLAME CURING MACHINE FOR CAN BODIES
Filed Nov. 24, 1959 7 Sheets-Sheet 5

INVENTOR.
CHARLES T. WALTER
BY
ATTORNEYS

United States Patent Office 3,050,297
Patented Aug. 21, 1962

3,050,297
FLAME CURING MACHINE FOR CAN BODIES
Charles T. Walter, Lemont, Ill., assignor to Continental Can Company, Inc., New York, N.Y., a corporation of New York
Filed Nov. 24, 1959, Ser. No. 855,046
29 Claims. (Cl. 263—8)

This invention relates in general to new and useful improvements in the art of flame curing can bodies, and more specifically relates to a machine for automatically receiving can bodies from a can body enameling machine, flame curing the enamel coating, and then returning the can bodies to a can line.

It is well known in the art of can making that the inside of a metal can body must usually have a lining of enamel to protect the can from the product, or to protect the product from the chemical influence of the metal can. For example, some canned products, such as spinach, are so highly corrosive that the can would deteriorate rapidly unless the can was lined with a specially prepared enamel. On the other hand, cherries, for example, when packed in a tin can, will bleach or fade unless the can is lined with a specially prepared enamel.

The first step in curing an enamel coating on a metal surface is the removal of the solvent of the enamel. Rapid solvent removal, therefore, is of prime importance in obtaining fast curing of the enamel.

The present invention proposes to provide a machine which may be placed in the can line, which machine will automatically place a burner within each of the can bodies and ignite the burner to flame cure the enamel by the removal and burning of the solvent thereof. In this manner, the enamel coating on the interior surface of the can bodies may be rapidly cured so that the can line may run at the desired rate.

Another object of the invention is to provide a novel machine for flame curing the enamel coatings on the interiors of can bodies, the machine including a turret and an endless conveyor passing around the turret, the endless conveyor supporting a plurality of can holders and the turret supporting burners which are aligned with the can body holders as they pass about the turret, the burners being provided with means for automatically positioning them within the can bodies and for producing a flame within the individual can body to drive off and burn the solvent of the enamel coating thereof.

Another object of the invention is to provide a novel flame curing machine for can bodies, the flame curing machine including a turntable having a plurality of burners, there being a burner at each station of the turret or turntable, and there being an endless conveyor extending about at least a portion of the turret, the endless conveyor carrying can body holders which are aligned with the individual stations of the turret as they pass thereabout, the endless conveyor being provided with a can body receiving station and a can body discharge station, the endless conveyor extending along a relatively long path between the turret and the can body discharge station, and there being a housing about the conveyor through which air is forced to cool the can bodies subsequent to the flame curing operation.

Still another object of the invention is to provide a flame curing machine for can bodies, the flame curing machine including a turret having a plurality of stations, there being a burner at each of the stations, the burner being mounted for movement into the interior of a can body for curing the enamel coating thereof, and there being provided suitable controls for igniting the burner, the controls being of the no-can-no-flame type.

A further object of the invention is to provide a novel can body holder supporting a can body during a flame curing operation, the holder including a plurality of fingers which engage the edges of the flanges of the can body at opposite ends thereof with the can body being positioned by a magnet associated with the fingers, whereby the contact between the can body and the can holder is restricted to a limited area to prevent the concentrated heat transfer between the can body and the can holder, thereby assuring an even cooling of the can body.

Still another object of the invention is to provide a novel control mechanism for operating a burner of a flame curing machine, the burner being of the gas fuel type and having a gas control valve, the machine having a valve operating member which is normally positioned for engaging a valve to move it to an open position, the valve operating member being movable to a retracted position whereat the valve would not be operated, and there being provided a sensing device for determining the existence of a can body within a can holder and the operation of mechanism to withdraw the valve operating member to an inoperative position when there is no can body within the can holder at the particular station.

A still further object of the invention is to provide a novel flame curing machine for can bodies, the flame curing machine including a plurality of stations disposed about a turret, each of the stations including a burner which utilizes gas as a fuel, with the flow of the fuel to each burner being controlled by a valve, and there being provided control means for opening and closing the valve to control the time of the flame curing operation, the means for controlling the valve being adjustably mounted and being remotely positionable so that the flame curing time may be varied during the operation of the machine.

Yet another object of the invention is to provide a novel holder for can bodies for use in conjunction with a flame curing machine for can bodies, the can holder being of a construction to receive can bodies of different diameters and the center lines of all of the can bodies being co-extensive.

Another object of the invention is to provide a novel can body holder for use in conjunction with a flame curing machine, the can body holder having a plurality of fingers which engage the edges of the flanges of the can body at opposite ends thereof, the fingers being carried by a support and being removable therefrom, additional fingers being provided as replacements for the original fingers and the shapes of the additional fingers varying from the shapes of the original fingers so that the can body holder will accept can bodies with varying diameter and height.

Still another object of the invention is to provide a novel control for operating a burner of a flame curing machine, the control including a valve operating member which is normally positioned for engagement by a valve lever and which is retractable to an inoperative position, and a control mechanism for automatically moving the valve actuating member to a retracted position when no can is to be presented for curing by the burner, the means for moving the valve actuating member to a retracted position including a sensing device which will sense the existence or absence of a can body within the can holder, and a control switch which will be operated only when the can body holder is aligned with the sensing device, the switch of the sensing device being connected in series so that the circuit controlled by the sensing device is not controlled thereby when the can bodies are disposed in intermediate positions with respect to the can body holder.

A still further object of the invention is to provide a novel flame curing machine for can bodies, the machine including a turret having a plurality of stations spaced thereabove, each of the stations including a burner which is vertically movable into and out of a can body, and the burner being rotatable and including a rotary union driven by a belt and pulley arrangement, the belt arrangement being disposed about the exterior of the turret and engaged by the individual pulleys as the burners are elevated and moved about the turret.

With the above, and other objects in view that will hereinafter appear, the nature of the invention will be more clearly understood by reference to the following detailed description, the appended claims, and the several views illustrated in the accompanying drawings.

Figures 1, 17:
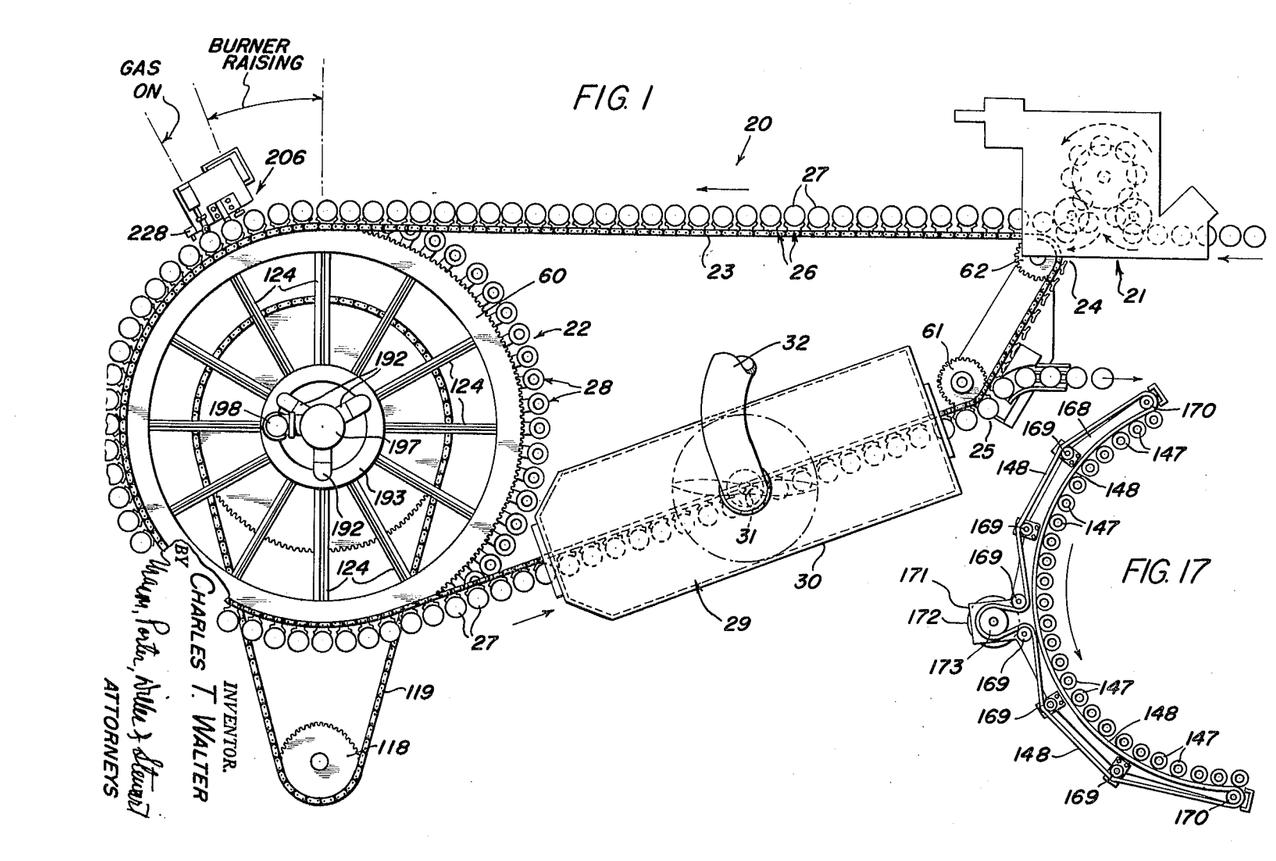
FIGURE 1 is a schematic plan view showing the arrangement of the various components of the flame curing machine.
FIGURE 17 is an enlarged fragmentary plan view showing the details of the drive belt for engaging the pulleys of the rotating unions and rotating the unions.

The over-all arrangement of the components of the embodiment of the invention illustrated in the drawings is best illustrated in FIGURE 1, wherein the flame curing machine is generally referred to by the numeral 20. The flame curing machine 20 is associated with a can body enameling machine, generally referred to by the numeral 21, and receives enameled can bodies therefrom.

The flame curing machine 20 includes a turret, generally referred to by the numeral 22, about which an endless conveyor 23 passes. The endless conveyor 23 includes a can body receiving station 24, a can body discharge station 25 and the travel thereof is generally triangular in plan.

The endless conveyor 23 supports a plurality of can holders, generally referred to by the numeral 26. The can holders 26 are closely adjacent each other, and each can holder 26 is intended to support a can body 27. The turret 22 is provided with a plurality of burner stations, generally referred to by the numeral 28, disposed in spaced relation thereabout. The burner stations 28 are spaced apart a distance equal to the spacing of the can body holders 26.

It is the intention of the invention that the flame curing machine 20 receive freshly enameled can bodies 27 from the can body enameling machine 21 and that the can bodies 27 be delivered to the turret 22 at individual ones of the burner stations 28. The enamel internal coating of each of the can bodies 27 is then flame cured by one of the burners 28. After the can bodies have been flame cured, they pass through a cooling chamber 29 wherein they are cooled back to approximately room temperature. It is to be noted that the cooling chamber 29 is disposed on the return run of the endless conveyor 23 intermediate the turret 22 and the can body discharge station 25. The cooling chamber 29 includes an elongated chamber 30, and in its simplest form, includes a fan 31 and a discharge duct 32.

Figures 9, 10, 11, 12:
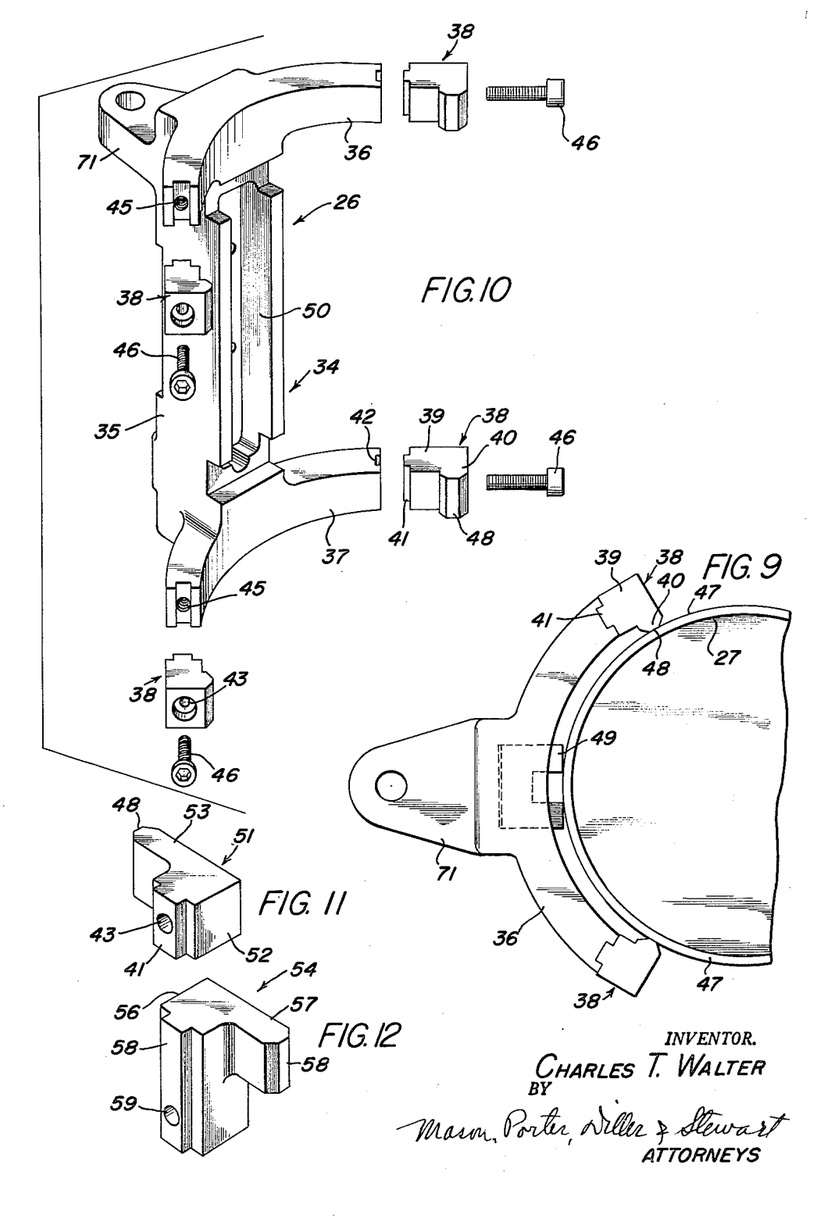
FIGURE 9 is an enlarged fragmentary plan view of one of the can body holders with the supporting guide means thereof omitted and shown in engagement with a can body.
FIGURE 10 is an enlarged exploded perspective view of the can body holder of FIGURE 9, and shows further the details thereof.
FIGURE 11 is a perspective view of an interchangeable finger for one of the can body engaging fingers of the can holder for use in accommodating a can body of a smaller diameter than the can body of FIGURE 9.
FIGURE 12 is an enlarged perspective view of a modified form of finger which is particularly adapted for engaging a can body which is either longer than or shorter than the can body of FIGURE 9 and of a smaller diameter than the can body of FIGURE 9.

In order to fully understand the operation of the flame curing machine 20, it is first advisable to consider the construction of the individual can body holders 26 and the relationship of a can body with respect thereto. Each can body holder 26 includes a support, generally referred to by the numeral 34. The support 34 basically includes an upright portion 35 which terminates at its upper end in an arcuate portion 36 and at its lower end in an arcuate portion 37. The arcuate portions 36 and 37 terminate at their opposite ends in removable and interchangeable can body engageable fingers 38. Each of the fingers 38 is L-shaped in plan, and includes a first leg 39 and a second leg 40. The leg 39 functions as a continuation of the arcuate portion 36 or 37 to which it is connected, and is provided at the end thereof remote from the leg 40 with a vertical key 41 which is seated in a vertical recess 42 in the associated end of its respective arcuate portion. Each first leg 39 is provided with a bore 43 which extends therethrough and is alignable with an internally threaded bore 45 in the end of the associated arcuate portion. A removable fastener 46 passes through the bore 43 and is threadedly engaged in the threaded bore 45 to retain the finger 38 in place.

At this time, it is pointed out that each of the can bodies 27 is provided at the ends thereof with outwardly directed flanges 47 which facilitate the securement of can ends (not shown) to the can bodies. It is intended that the fingers 38 engage only the flanges 47 of the can bodies 27 so as to minimize the contact area between the can body and its associated holder 26. In this manner, heat transfer from the can body to the can body holder is reduced to a minimum. In order to effect this, the ends of the second leg 40 remote from the first leg 39 are tapered to provide narrow can body engaging surfaces 48.

It is to be understood that the fingers 38 are spaced apart a distance substantially equal to the height of the particular can body 27 which is to be supported by the can body holder 26. Accordingly, the flanges 47 will engage only the fingers 38 of the can body holder 26. In order that the can body 27 will be retained in place with respect to the can body holder 26, there is provided a magnet 49. The vertical portion 35 of the support 34 is provided with a channel 50 extending vertically therein for receiving the magnet 49. It is to be understood that the magnet 49 will be disposed closely adjacent to, but spaced from, the can body 27 so that it will be effective to hold the can body 27 in place with respect to the can body holder 26, and at the same time will not contact the can body, so as to eliminate the transfer of heat from the can body to the magnet.

It is intended that the can body holder 26 support can bodies of various sizes. To this end, a number of fingers, in addition to the fingers 38, are provided. Assuming that a can body of the same length as the can body 27, but of a smaller diameter than the can body 27, is to be supported by the can body holder 26. It is necessary that the fingers 38 be removed and be replaced by other fingers which have longer second legs 40. Such a can body engaging finger is illustrated in FIGURE 11, and is generally referred to by the numeral 51. The finger 51 includes a first leg 52, which is identical with the first leg 39, and has a vertically extending key 51, as well as the bore 43 therethrough. On the other hand, the finger 51 has a relatively long second leg 53 as compared to the relatively short second leg 40 of the finger 38. The extreme end of the short leg 53 is tapered to provide the can body engaging surface 48.

When a smaller diameter can body is supported by the can holder 26, the outer surface of the can body will be spaced a greater distance from the magnet 49, with the result that the effect of the magnet 49 on the can body will not be as great. If desired, the magnet 49 may be moved towards the can body being supported by placing suitable shims (not shown) behind the magnet 49 within the channel 50. At this time, it is also pointed out that the centers of all can bodies carried by the individual can body holder 26 will be disposed along a common line.

When it is desired to support a longer can body than the can body 27 utilizing the can body holder 26, it is necessary that a modified form of finger be utilized. Such a finger is illustrated in FIGURE 12, and is generally referred to by the numeral 54. The finger 54 includes a first leg 56 and a second leg 57. The first leg is relatively elongated as compared to the second leg. The first leg 56 is provided on the end thereof remote from the second leg 57 with a vertical key 58, the key 58 corresponding to the key 41. A bore 59 extends through the lower part of the first leg 56, the bore 59 corresponding to the bore 43 and adapted to receive one of the fasteners 46. The second leg 57 is vertically offset with respect to the bore 59, with the result that the second leg 57 will be vertically offset from its respective one of the arcuate portions 36 and 37. Like the second leg 40, the second leg 57 is provided with a tapered end which defines a can body engaging surface 48.

At this time, it is pointed out that it is necessary to provide two types of the fingers 54, a left hand finger and a right hand finger. The same design of finger will fit diagonally opposite corners of the support 34, and therefore only two types of fingers are required. It is also to be noted that while the fingers 54 are usable to support can bodies which are longer than the can bodies 27, when the finger 54 illustrated in FIGURE 12 is connected to the right hand end of the arcuate portion 37 as opposed to being connected to the right hand end of the arcuate portion 36, the second legs 57 will be offset towards each other, and thus the fingers 54 may be utilized for supporting can bodies which are shorter than the can bodies 27. Thus the finger 54 may have a dual function.

The endless conveyor 23 is in the form of a chain which passes around a very large sprocket 60 on the turret 22. Auxiliary sprockets 61 and 62 are disposed at the can body discharge station 25 and the can body receiving station 24, respectively. This is best illustrated in FIGURE 1.

Figure 8:
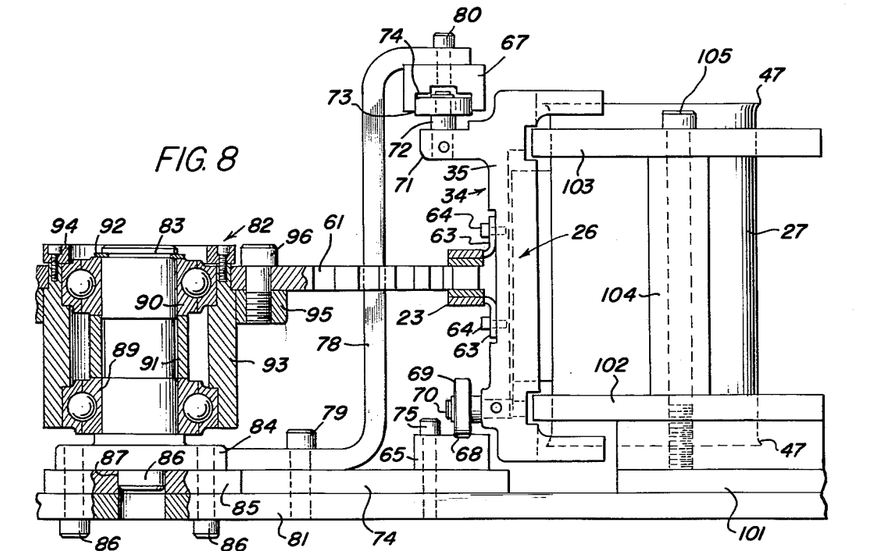
FIGURE 8 is an enlarged fragmentary vertical sectional view taken substantially upon the plane indicated by the section line 8—8 of FIGURE 7, and shows the specific mounting of one of the can body holders and the manner in which it is guided in its movement.

Certain of the links of the chain which forms the endless conveyor 23 are provided with oppositely directed straps 63 which are secured to the supports 34 by fasteners 64. This is best illustrated in FIGURE 8. It will be readily understandable that the endless conveyor 23 cannot support the can body holders 26 and the can bodies 27 carried thereby. For that reason, suitable support means are provided for the can body holders 26.

Except immediately at the sprockets 60, 61 and 62, the endless conveyor 23 is supported by the can body holders 26. A pair of rails 65 and 67 extend generally between the sprockets 62 and 60, the sprockets 60 and 61, and the sprockets 61 and 62. The rail 65 is disposed below the rail 67 and has a shallow groove 68 therein which receives a follower 69 of each of the can body holders 26. The follower 69 is supported on an axle assembly 70 carried by the lower portion of the support 34. The upper part of the vertical portion 35 of the support 34 is provided with an outwardly projecting ear 71. The ear 71, in turn, supports a vertical axle assembly 72, which carries a wheel 73. The wheel 73 is seated in a relatively wide channel 74 formed in the underside of the rail 67.

The rail 65 is seated on a plate 74 and is secured thereto by a fastener 75. The plate 74 is, in turn, supported by a standard 76 which has the upper end thereof secured to the underside of the plate 74. A Z-shaped bracket 78 is secured to the plate 74 adjacent the rail 65 by means of a fastener 79. The rail 67 underlies the upper end of the Z-shaped bracket 78 and is secured thereto by means of a fastener 80.

Figure 7:
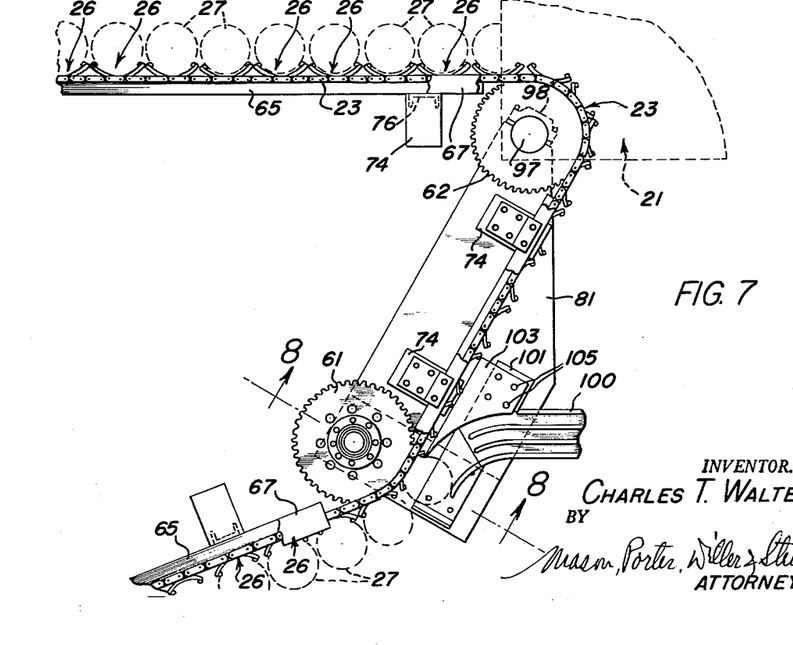
FIGURE 7 is an enlarged fragmentary plan view showing the general details of the endless conveyor both at the can body receiving station and at the can body discharge station.

Attention is now directed to FIGURES 7 and 8 wherein it is shown that the support for the endless conveyor 23 and the can body holders 26 in the vicinity of the sprockets 61 and 62 includes a large plate 81 which may be suitably supported at the necessary height in any manner. The plates 74 overlie and are secured to the plate 81 by the fasteners 79. The sprocket 61 is removably supported from the plate 81 by a support structure, generally referred to by the numeral 82. The support structure 82 includes an upstanding spindle 83 which has a base 84. The base 84 is seated on a spacer plate 85 which, in turn, is seated on the plate 81. Fasteners 86 pass through the plate 81, the spaced 85 and into the base 84. The base 84 is provided with a projecting centering pin 86 which projects into an opening 87 formed in the spacer 85.

The spindle 83 supports two vertically spaced bearing assemblies 89 and 90 which are maintained in spaced relation by a spacer 91. The bearing assemblies 89 and 90 are retained on the spindle 83 by a locking ring 92 engaging the uppermost bearing assembly 90 and carried by the upper part of the spindle 83.

The bearing assemblies 89 and 90, in turn, support a hub 93 which is maintained in place by a removable locking ring 94 secured to the upper edge thereof. The hub 93 also carries an annular mounting flange 95 intermediate the ends thereof on which the inner part of the sprocket 61 is seated. Fasteners 96 pass through the sprocket 61 into the mounting ring 95 to removably secure the sprocket 61 to the hub 93.

Although the mounting of the sprocket 62 is quite different from the mounting of the sprocket 61, if desired, it could be the same. The mounting of the sprocket 62 illustrated in FIGURE 7 includes a spindle 97 which is rotatably supported by a pillow block 98 carried by the plate 81.

The plate 81 also carries the means for removing the can bodies 27 from the can body holders 26 at the can body discharge station 23. These means include a guide chute 100 for the can bodies which is secured to the plate 81 through a plate 101. Associated with the chute 100 is a pair of stripper plates 102 and 103 which are disposed in vertically spaced relation and are retained in this spaced relation by one or more spacers 104. Elongated fasteners 105 pass down through the spacers 104 and secure the stripper plates 102 and 103 in place and to the plate 101.

Figure 2:
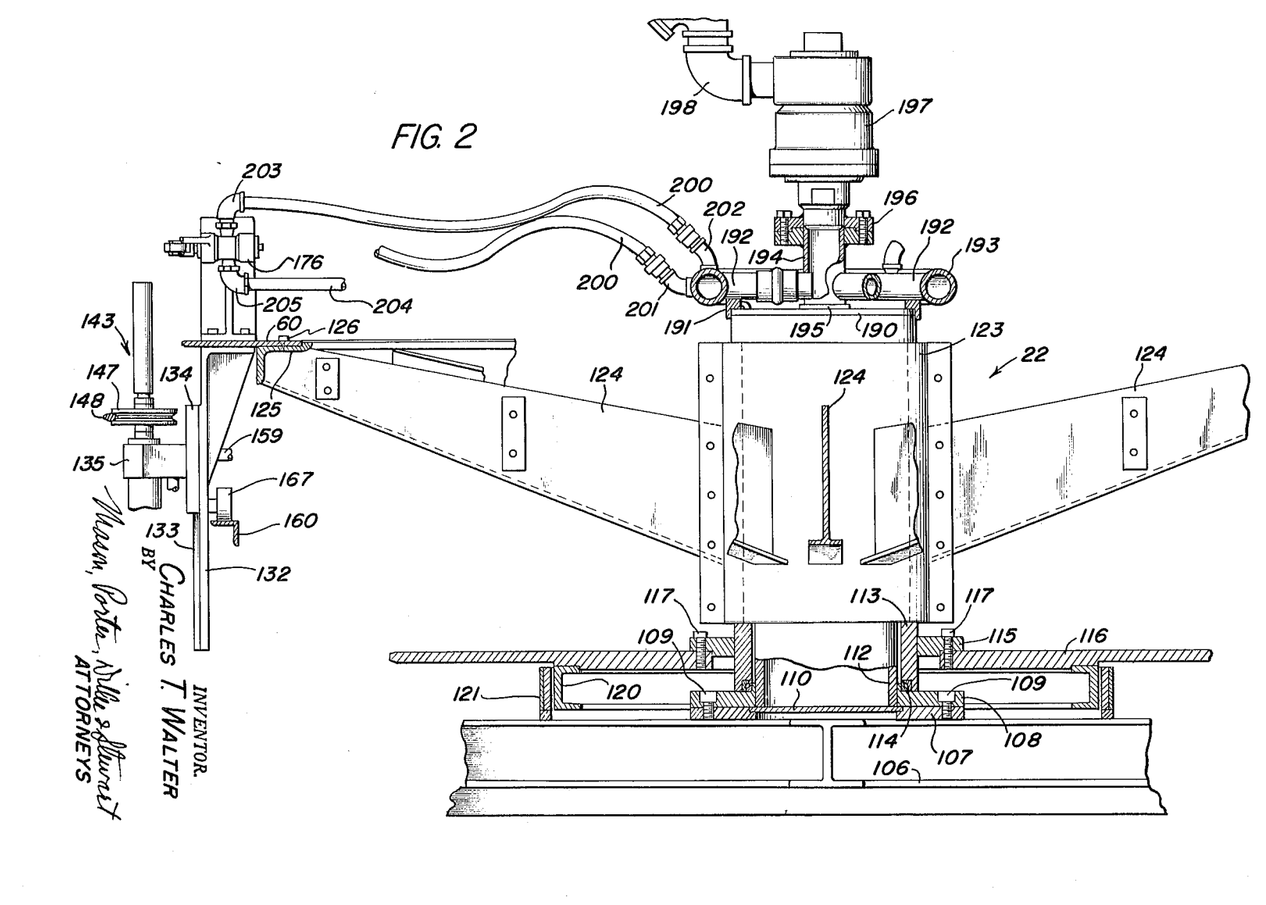
FIGURE 2 is an enlarged fragmentary elevational view, with portions broken away and shown in section, of the turret portion of the flame curing machine.

Reference is now made to FIGURE 2 in particular, wherein the general details of the turret 22 are illustrated. The turret 22 includes a suitable base 106 on which a support ring 107 is mounted. The support ring 107, in turn, supports a bearing ring 108 which is secured in place by fasteners 109. A base 110 of a spindle 112 is clamped between the bearing ring 108 and the base ring 107. The spindle 112 is of a tubular construction and extends vertically a considerable distance. A vertical tubular shaft 113 is telescoped over the spindle 112 and is disposed coaxially therewith. A bearing unit 114 carried by the bearing ring 108 supports the lower end of the tubular shaft 113 for rotation. A second bearing unit (not shown) carried by the upper end of the spindle 112 engages the upper portion of the tubular shaft 113 and further aids in the supporting of the tubular shaft 113 for rotary movement.

A mounting ring 115 is secured to the lower portion of the tubular shaft 113. A drive sprocket 116 is secured to the tubular shaft 113 through the mounting ring 115 by means of fasteners 117. As is best illustrated in FIGURE 1, a drive sprocket 118 is disposed in spaced relation from the turret 28. A drive chain 119 is entrained over the sprockets 116 and 118 and drivingly connects the two together.

Referring once again to FIGURE 2 in particular, it will be seen that a brake ring 120 is secured to the underside of the sprocket 116. A brake band 121 encircles the brake drum or ring 120 and is supported from the base 106. The brake band 121 may be actuated to clamp the brake drum 120 so as to immediately stop the rotation of the turret 22 when so desired. If desired, the brake mechanism may be operated simultaneously with the operation of the drive for the turret 22 by interconnecting the two.

A vertically split cylindrical support 123 is clamped about the shaft 113. The support 123 carries a plurality of support arms 124 which are circumferentially spaced and which slope upwardly and outwardly. The ends of the support arms 124 are connected together by a circular bracket 125 which is angular in cross-section. The sprocket 60 overlies the bracket 125 and is secured thereto by means of fasteners 126.

Figures 3, 4:
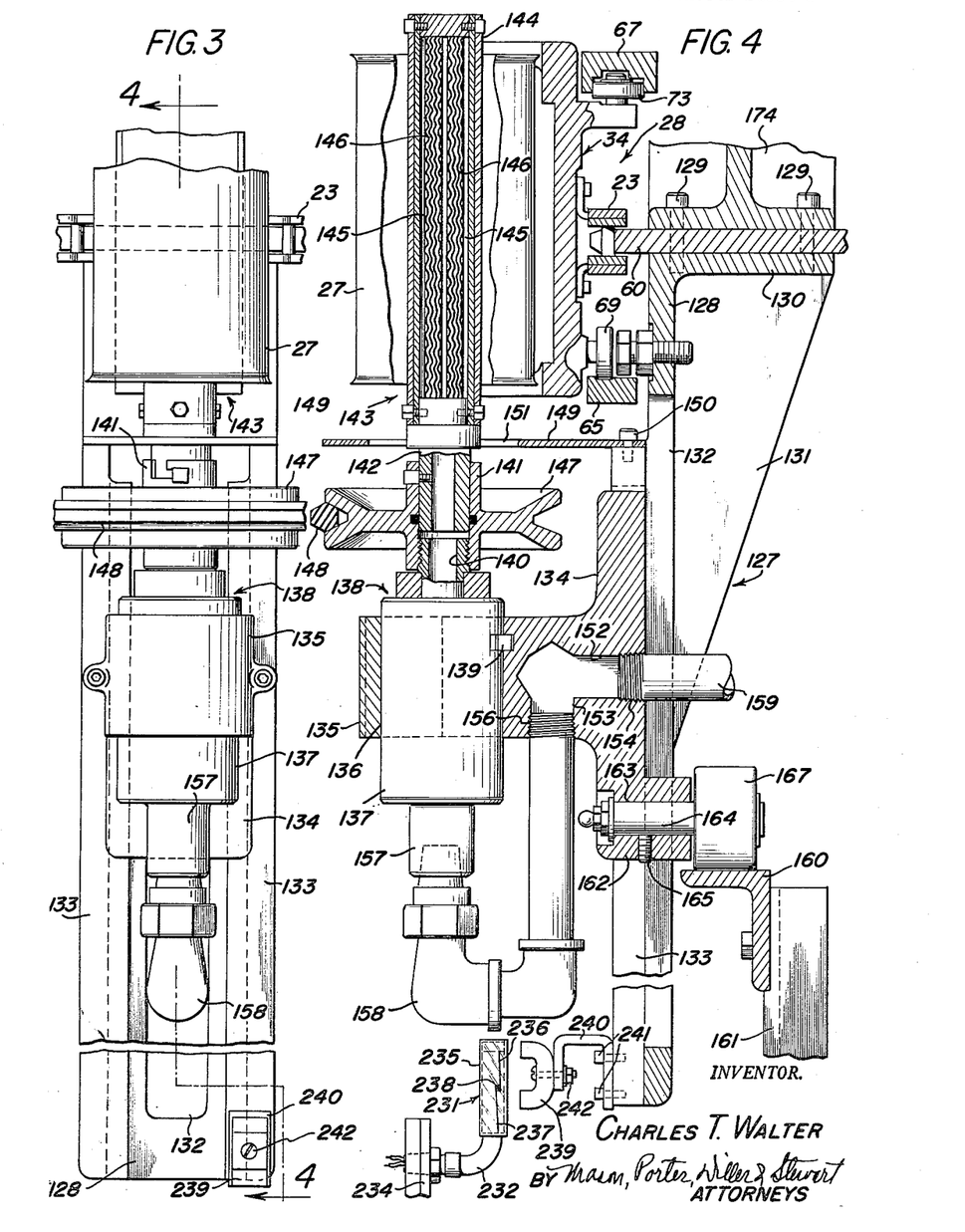
FIGURE 3 is an enlarged fragmentary elevational view of one of the stations of the turret, and shows the general details of one of the burners thereof, a can body being positioned with respect to the burner for a flame curing operation.
FIGURE 4 is an enlarged fragmentary vertical sectional view taken substantially upon the plane indicated by the section line 4—4 of FIGURE 3, and shows the specific details of the mounting of one of the burners and the relationship of a can body with respect thereto.

Each of the burner stations 28 includes a support generally referred to by the numeral 127. The support 127 includes a vertical plate portion 128 which terminates at its upper end in a horizontal plate portion 130 which underlies the sprocket 60 and is removably secured thereto by means of fasteners 129. The plate portions 128 and 130 are braced relative to each other by diagonal braces 131. Also, the plate portion 128 is provided with an elongated vertical slot 132. The details of these are best illustrated in FIGURE 4.

A pair of undercut guide members 133 are secured to the vertical plate 128 adjacent the opposite edges thereof. A vertically movable carriage 134 is secured to the support assembly 127 for guided vertical movement by the guides 133. The carriage 134 includes a centrally located, horizontally projecting portion 135 having a vertical bore 136 therethrough. The bore 136 has received therein a base fitting 137 of a rotary union, generally referred to by the numeral 138. The base fitting 137 is secured in the bore 136 by means of a key 139.

The rotary union 138 includes a pipe 140 which is rotatable with respect to the base fitting 137. A coupling 141 is secured to the pipe 140, and the coupling 141 is, in turn, connected to a pipe 142 of a burner, generally referred to by the numeral 143. The burner 143 includes an elongated head 144 having elongated openings 145 formed therein. In each of the openings 145 corrugated strip burners 146 are positioned for the purpose of controlling the flow of gas from the head 144.

At this time, it is pointed out that each of the burners 143 is rotated after it is positioned within a can body 27. The rotation of the burner 143 is accomplished by means of a pulley 147 which is attached to the coupling 141. A drive belt 148 is engaged with the pulley 147 when the burner 143 is in its flame curing position. The details of the drive belt 148 will be described hereinafter.

There is also provided a guard 149 which is secured to the upper ends of the guide members 133 by means of fasteners 150. The guard 149 has an opening 151 therethrough of a size to receive the burner 143. The guard 149 serves to protect the rotary union 138 from the flame of burner 143.

Still referring to FIGURE 4, it will be seen that the carriage 134 is provided with a horizontal bore 152 which opens through the right side thereof, as viewed in FIGURE 4. A vertical bore 153 intersects the horizontal bore 152 and opens down through the underside of the projection 135. The outer portion of the bore 152 is provided with internal threads 154, and the outer portion of the bore 153 is provided with threads 156. The base fitting 137 has a projecting inlet fitting 157. Suitable piping 158 extends between the inlet fitting 157 and the bore 153. Another pipe 159 is threaded in the bore 152 and projects through the opening 132.

In the sequence of operation of the flame curing machine 20, the can bodies 27 are presented to the stations of the turret 22, with the burners 143 in their lowered positions. After the can bodies 27 have been aligned with their respective burners 143, the burners 143 are elevated to move into the interior of the can bodies, as is best shown in FIGURE 4. In order to accomplish this, there is provided a cam track 160 which extends about the center of the machine concentric thereto. The cam track 160 is supported by a plurality of uprights 161 which are supported from the base 106. Each of the carriers 134 has a lower offset extension 162 with a bore 163 extending horizontally therethrough. An axle 164 is positioned within the bore 163 and is secured in place by a setscrew 165. A roller 167 is mounted on the axle 164 and engages the cam track 160 to control the vertical position of the carrier 134 and the burner 143 carried thereby.

Reference is now made to FIGURE 17 wherein the details of the drive belt 148 are illustrated. A suitable support member 168 extends about the outer part of the turret 22 generally at the height of the pulley 147 of each of the burners 143. Suitable guide pulleys 169 are carried by the support 168 at spaced intervals. Also, return pulleys 170 are disposed at the opposite ends of the support 168. The support 168 includes an extension 171 on which an electric motor 172 is mounted. The electric motor 172 includes a drive pulley 173 which is disposed intermediate a pair of the pulleys 169, and about which the drive belt 148 passes. It will be noted that the arrangement of the pulleys 169 and 170 is such that the outer portion of the drive belt 148 is supported by the pulleys 169 and 170. On the other hand, the inner portion of the drive belt 148 has a tendency to assume a straight line condition between the pulleys 170. This straight line condition is prevented by the numerous pulleys 147 which are disposed in spaced relation about the turret 22 and which engage the inner portion of the drive belt 148 to be driven thereby. Attention is directed to FIGURE 4 wherein it is shown that the drive belt 148 is of the double V type, so that it will engage both inside and outside pulleys.

At each of the burner stations 28, a support 174 extends upwardly from the sprocket 60 in alignment with the support 127. The support 174 is secured to the sprocket 60 by the fasteners 129. The support 174 includes a vertical mounting plate 175 on which a control valve 176 is mounted. The control valve 176 is of the type which has a reciprocating valve stem 178 for controlling the flow of gas therethrough. The valve stem 178 is provided with a fitting 179 which is connected to a lever type operator, generally referred to by the numeral 180.

The operator 180 is generally L-shaped in plan and includes a first leg 181 and a second leg 182. A bifurcated support fitting 183 extends from the valve 176 and receives an intermediate portion of the first leg 181. A pivot pin 184 extends through the first leg 181 and the support fitting 183. The first leg 181 has a downwardly offset end portion 185 which carries a roller 186. The second leg 182 carries a roller 187. It is to be noted that the operator 180 has a pin and slot connection, as at 189, with the fitting 179. Thus, when the operator 180 is pivoted about the pivot pin 184, the valve stem 178 will be retracted or extended, depending upon the direction of pivot of the operator 180.

Reference is made once again to FIGURE 2, wherein it will be seen that the upper end of the shaft 113 is closed by a plate 190. The plate 190 carries a support ring 191 on which supply lines 192 for a gas manifold 193 are seated. The supply lines 192 extend to and are connected to a vertical gas pipe 194, and are communicated with the interior thereof. The lower end of the gas pipe 194 is closed by a plate 195 which rests upon the plate 190 and is suitably secured thereto. A coupling 196 secures a rotary union 197 to the upper end of the gas pipe 194. A gas supply line 198 is connected to the rotary union 197 for supplying gas thereto.

The gas manifold 193 supplies gas to the individual burners 143. Accordingly, there is one gas supply line 200 for each of the burners 143. The gas supply lines 200 are connected to the gas manifolds 193 by fittings 201 and 202, the fittings 201 extending horizontally from the gas manifold 193 and the fittings 202 extending generally vertically from the gas manifold 193. The fittings 201 and 202 are alternated so as to provide sufficient room therefor. Each of the gas supply lines 200 extends to its respective valve 176 and is connected thereto by a fitting 203. A second gas line 204 is connected to the exit end of the valve 176 by a fitting 205. The gas supply line 204 is then connected to the pipe 159.

Referring once again to FIGURE 1 in particular, it will be seen that in the sequence of operation of the invention, after the can bodies 27 are engaged with the turret 22, the burners 143 are elevated into the can bodies 27, as is shown in FIGURE 4. After the burners 143 have been elevated, it is then necessary that the gas supply to the individual burner 143 be turned on. This is controlled by a gas-on mechanism, generally referred to by the numeral 206. The gas-on mechanism 206 is illustrated in more detail in FIGURES 5 and 6, wherein the can bodies 27 are shown in dotted lines, and the details of the can body holders 26 are omitted for purposes of clarity.

Figures 5, 6:
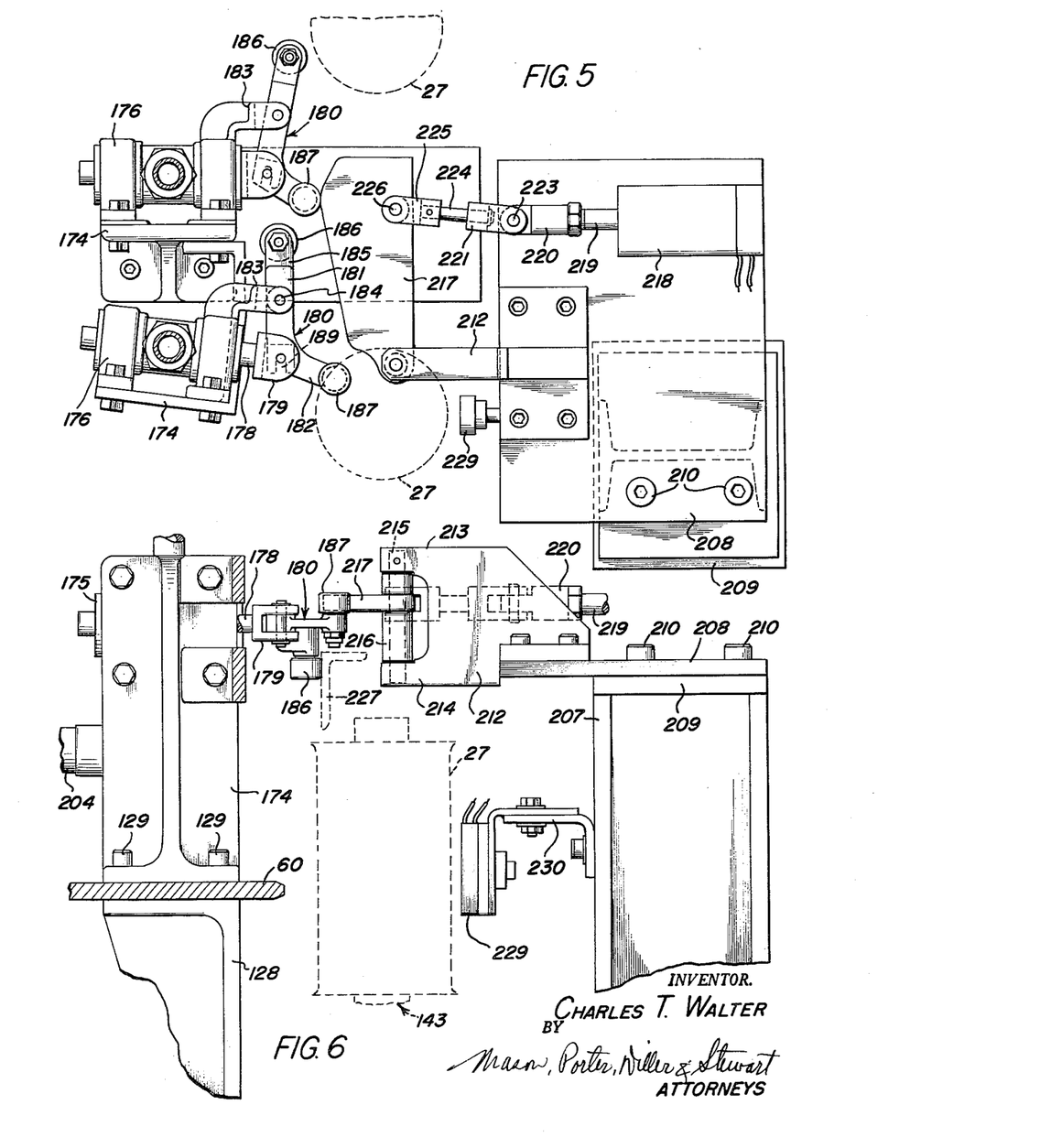
FIGURE 5 is an enlarged fragmentary plan view taken above the turret in the position where the gas to the individual burner is turned on, and shows the details of a gas control valve of the individual station, and the means for moving the gas control valve to an "on" position.
FIGURE 6 is an enlarged fragmentary vertical sectional view showing further the details of the means for actuating the valve to move the valve to an "on" position, the position of a sensing device with respect to a can body being illustrated.

The gas-on mechanism 206 includes a standard 207 which is positioned adjacent the exterior of the turret 22. The standard 207 supports a plate 208 at the upper end thereof, the plate 208 being secured to a cap plate 209 of the standard 207 by means of fasteners 210.

A support bracket 212 is secured to the plate 208 and projects inwardly therefrom towards the turret 22. The support bracket 212 includes a pair of vertically spaced support portions 213 and 214 between which a vertical shaft 215 extends. A sleeve 216 is journaled on the shaft 215 and one end of a cam member 217 is secured to the sleeve 216 for pivoting therewith.

A control member 218 is also secured on the plate 208. The control member 218 may be of any type which may be electrically controlled and which has a reciprocating plunger 219. The plunger 219 has a fitting 220 which is pivotally connected to a fitting 221 by a pivot pin 223. The fitting 221 is supported on a shaft 224 which is, in turn, connected to the cam member 217 by means of a bifurcated fitting 225, the bifurcated fitting 225 being pivotally connected to the cam member 217 by a vertical pivot pin 226.

It is to be noted that the cam member 217 is disposed at an elevation to be engaged by the roller 187. It is also pointed out at this time that the valve 176 is normally closed, except within the control area. In order to accomplish this, a cam track 227, which is shown in dotted lines in FIGURE 6, extends about that half of the turret 22 about which the endless conveyor 23 does not pass. Thus, when the valve 176 approaches the cam member 217, the valve 176 is closed.

As the individual valve 176 passes the cam member 217, the roller 187 thereof will engage the cam member 217. The shape of the cam member 217 is such that it will move the valve 176 to its open position and thus turn the gas on to the individual burner 143 connected to the valve 176. When the gas is turned on, the gas will be ignited at the burner by means of a suitable igniter which may be, for example, in the form of a pilot which is best illustrated in FIGURE 1, the pilot being referred to by the numeral 228.

It is undesirable that the burner 143 be ignited unless a can body 27 is disposed thereover. Accordingly, the flame curing machine 20 is provided with a no-can-no flame mechanism. This mechanism includes the actuator 218 which is electrically controlled. A suitable sensing device 229 is supported from the support 207 by means of an adjustable support bracket 230. The sensing device 229 is positioned immediately adjacent the path of the can bodies 27 and is connected in an electrical circuit for controlling the actuation of the actuation of the actuator 218. It is to be understood that when a can body 27 is not present, the circuit through the sensing device 229 to the actuator 218 will be completed.

It is not desired that the actuator 218 be actuated intermediate can bodies 27. Accordingly, the circuit for controlling the operation of the actuator 218 includes a magnetically operated switch 231 which is carried by a fitting 232 suitably mounted on a support 234. The switch 231 includes a sealed tube 235 in which a pair of spring arms 236 and 237 are mounted, the arms 236 and 237 being disposed in overlapping relation and having opposed contacts 238. The arms 236 and 237 are so mounted that the contacts 238 are normally spaced apart. However, when a magnet is positioned adjacent the switch 231 with one pole thereof adjacent the arm 236 and the opposite pole thereof adjacent the arm 237, and the magnet is properly oriented, the arm 236 will be moved towards the arm 237 away from the magnet, and the arm 237 will be pulled towards the arm 236 and towards the magnet. The switch 231 is a conventional switch and need not be described in more detail here.

Each of the supports 127 incorporates a magnet 239 of the type required for operating the switch 231. The magnet 239 is supported by a mounting bracket 240 which is secured to one of the guide members 133 by means of fasteners 241. The magnet 239 is secured to the mounting bracket 240 by a fastener 242.

The switch 231 is connected in series with the sensing device 229 and the actuator 218. The switch 231 is normally open and is closed only when the individual can body 27 is aligned with the sensing device 229. Thus, there is no actuation of the actuator 218 unless when a can body holder 26 is aligned with the sensing device 229, there is no can body 27 therein. In such event, the electrical circuit to the actuator 218 will be completed with the result that the actuator 218 will operate to pull the cam member 217 in a clockwise direction, as viewed in FIGURE 5. The cam member 217, when so moved, will no longer be in a position to be engaged by the rollers 187 of the associated operator 180, and thus, the valve 176 for the particular can body holder 26 will remain closed.

In the flame curing of the enamel coating of a can body, it is necessary that the time of operation of the individual burner 143 be rigidly controlled. The time will vary on numerous conditions, including can diameter, thickness of the enamel coating, and the type of enamel used in the coating. Therefore, for practical purposes, the valves 176 cannot be closed at a fixed position along the turret 22 for all conditions. Means for closing the valves 176 and adjusting the position of such valve closing means are illustrated in FIGURES 13 through 16, inclusive.

Figures 13, 14, 15, 16:
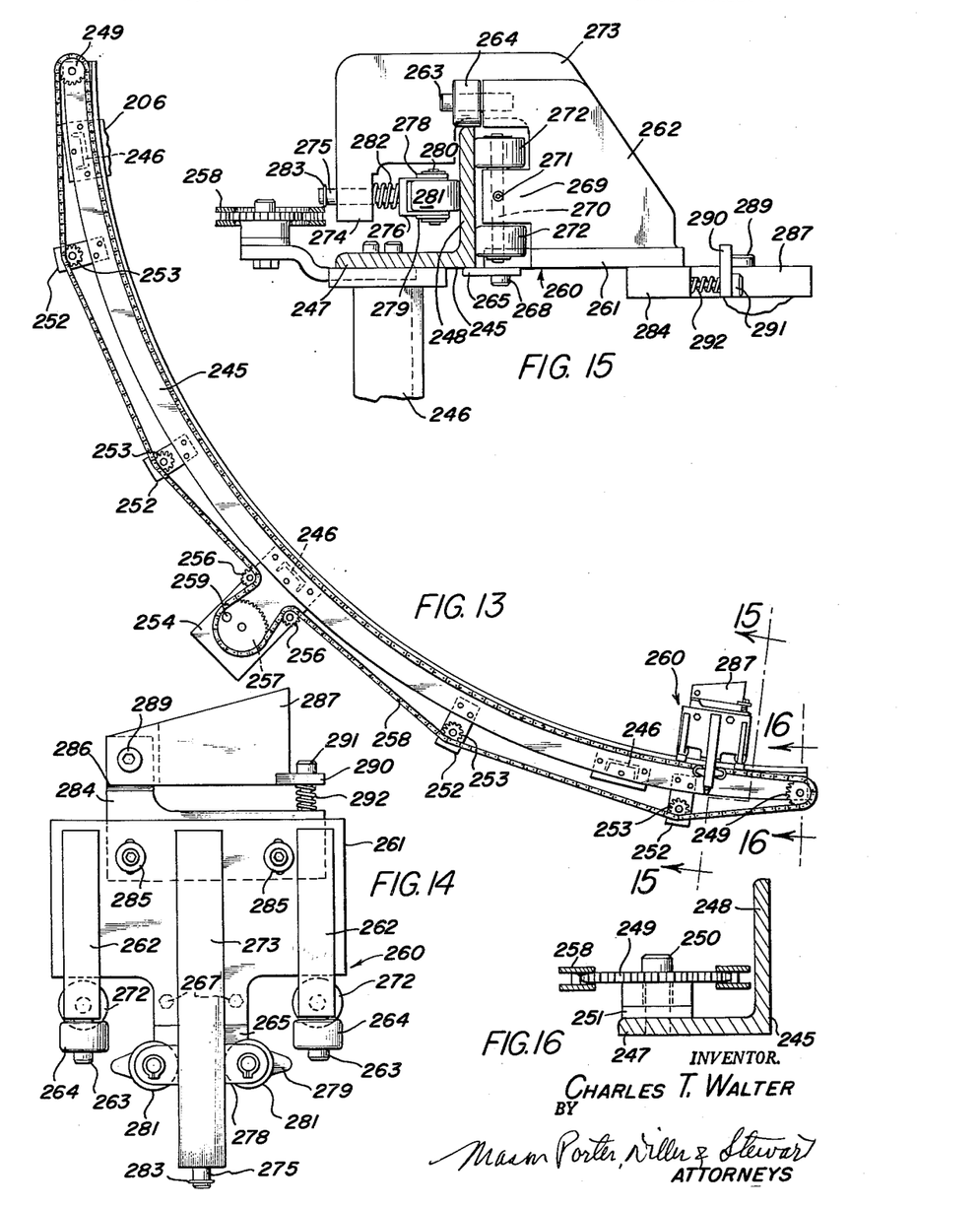
FIGURE 13 is an enlarged fragmentary plan view showing details of means for adjustably positioning a valve engaging member, which serves to close the valve of the various burners.
FIGURE 14 is an enlarged plan view of the valve engaging member and the support therefor.
FIGURE 15 is an enlarged fragmentary transverse vertical sectional view taken substantially upon the plane indicated by the section line 15—15 of FIGURE 13, and shows the specific mounting of a support for the valve engaging member.
FIGURE 16 is an enlarged fragmentary vertical sectional view taken substantially upon the plane indicated by the section line 16—16 of FIGURE 13, and shows the details of mounting of one of the sprockets for the chain which is utilized in positioning the movable valve engaging member.

An arcuate support member 245 is mounted about the exterior of the turret 22 starting approximately 90 degrees from the position of the cam member 217. The support member 245 is supported from the base 106 at spaced intervals by upstanding standards 246. It is to be noted that the support member 245 is in the form of an angle member having a horizontal flange 247 and an upstanding flange 248.

A pair of return sprockets 249 are mounted at opposite ends of the support member 245. The return sprockets 249 are each mounted on a vertical spindle 250 which is carried by a suitable fitting 251 secured to the horizontal flange 245, as is best illustrated in FIGURE 16. A plurality of straps 252 extend outwardly from the horizontal flange 247 of the support member 245 at spaced intervals. The straps 252 each supports an intermediate sprocket 253. A large plate 254 extends outwardly from the central portion of the support member 245. A pair of inner sprockets 256 are mounted on the plate 254. A large sprocket 257 is mounted on the plate 254 outwardly of the sprockets 256 and has its axis disposed intermediate the axes of the sprockets 256. An endless chain 258 extends about the sprockets 249. The endless chain 258 has a tendency to straighten out between the sprockets 249. The outer run of the chain 258 engages the sprockets 253 and is supported thereby. The intermediate part of the outer run of the chain 258 also passes around the sprockets 256 and the sprocket 257. The sprocket 257 is provided with a handle 259 to facilitate the turning thereof, and thus position the endless chain 258. The inner run of the chain 258 engages against the vertical flange 248 and is positioned thereby.

A carriage, generally referred to by the numeral 260, is mounted on the support member 245 for movement therealong. The carriage 260 includes a base plate 261 which is horizontally disposed. A pair of vertically disposed brackets 262 are disposed adjacent the opposite edges of the plate 261. Each of the brackets 262 has a horizontal axle 263 on which a roller 264 is positioned. The rollers 264 engage the upper edge of the vertical flange 248 and limit the downward movement of the carriage 260. Upward movement of the carriage 260 is prevented by a plate 265 which is secured to the underside of a projecting central portion 267 of the plate 261, by means of fasteners 268.

Each of the brackets 262 also includes a central projection 269. The central projection 269 supports a vertically disposed axle 270 which extends above and below the central projection 269 and which is retained in place by a setscrew 271. Rollers 272 are disposed above and below the projection 269 and engage the inner surface of the flange 248.

The carriage 260 also includes a central mounting bracket 273 which extends above and down outside of the flange 248 in overlying relation to the flange 247. The bracket 273 has a depending leg 274 which carries a horizontal rod 275, the rod 275 being mounted for horizontal sliding movement through the extension 274. A bifurcated fitting 276 is mounted on the right end of the rod 275, as viewed in FIGURE 15. An upper plate 278 overlies and is secured to the fitting 276. A lower plate 279 underlies and is secured to the fitting 276. The plates 278 and 279 are disposed in alignment and are in spaced parallel relation transversely of the axis of the rod 275. A pair of axles 280 extend between and through the plates 278 and 279 and support rollers 281 which engage the outer surface of the flange 248.

The flange 248 is clamped between the rollers 272 and the rollers 281 by pressure urging the rollers 281 against the flange 248. This is accomplished by means of a spring 282 which is carried by the rod 275 intermediate the fitting 276 and the extension 274, the spring 282 compressively engaging both the fitting 276 and the extension 274. Movement of the rod 275 to the right, as viewed in FIGURE 15, through the extension 274, is limited by a locking ring 283.

It is to be noted that the plate 279 extends beyond the plate 278 and lies in the general plane of the chain 258. Links of the chain 258 are connected to the ends of the plate 279 with the plate 279 forming an elongated link in the chain. Thus, as the chain 258 is moved by turning the sprocket 257, the carriage 260 may be positioned along the support member 245.

A support bracket 284 is secured to the underside of the plate 261 remote from the support member 245 by means of fasteners 285. The support bracket 284 is generally L-shaped in plan and includes a leg 286. The leg 286 has a major portion thereof overlaid by a horizontally disposed cam member 287, which cam member 287 is pivotally connected to the bracket 284 by means of a pivot member 289. The cam member 287 is provided with an ear 290 remote from the leg 286. A fastener 291 loosely passes through the ear 290 and is anchored in the mounting bracket 285. A spring 292 is mounted on the fastener 291 intermediate the ear 290 and the mounting bracket 284 and normally urges the cam member 287 away from the mounting bracket 284. Due to this mounting of the cam member 287, the cam member 287 may assure the full movement of a roller which may engage it and at the same time, is free to move due to the pressure exerted thereon by the roller after the roller has moved its full distance.

It is to be understood that the cam member 287 lies in the same plane as the roller 186. It is also to be understood that the cam member 287 functions as the means for moving each valve 176 to its closed position from its open position by engaging the roller 186 and swinging the operator 180 back to the valve closing position.

As described above, the carriage 260 may be adjusted about the turret 22. Since the cam member 287 is carried by the carriage 260, it will be readily apparent that the cam member 287 may be adjusted in its position about the turret 22 so that the spacing between the cam members 217 and 287 may be varied, thus varying the burning time of the individual burners 143.

Operation

In the operation of a can line incorporating the flame curing machine 22, can bodies, such as the can bodies 27, are first delivered to a can spraying machine, such as the machine 21, and an enamel coating is applied to the interior of the can bodies. As the coated can bodies 27 exit from the machine 21, they are positioned within the can body holders 26 and are maintained in place by the magnet 49 of the can body holders 26. The endless conveyor 23 then moves the can body holders 26 and their associated can bodies 27 to the turret 22. Each can body 27 is aligned with a burner station 28 of the turret 22.

Once the individual can body 27 has been engaged with the turret 22, the burner station 28 is at such a position with respect to the cam track 160 that the burner 143 thereof moves upwardly into the interior of the can can body 27 until it reaches the position illustrated in FIGURE 4. At this time, the pulley 147 of the individual burner 143 engages the drive belt 148 and the burner 143 begins to rotate within the can body 27.

Substantially simultaneous with the positioning of the burner 143 within the can body 27, the can body 27 passes the sensing device 229 and the roller 187 of the operator 180 for the valve 176 of the particular burner 143 engages the cam member 217. Since the can body 27 is in position, the cam member 217 will remain in its operative position and will be engaged by the roller 187 to open the valve 176. Gas then is permitted to flow to the burner 143, which gas is ignited by the pilot 228, or other suitable type of igniter.

With the individual burner 143 ignited, the burner 143 and the can body 27 in which the burner 143 is disposed, continue their travel about the turret 22 until a sufficient flame-on time for the curing of the enamel has elapsed. At this time, the individual burner station 28 reaches the position of the cam member 287 which engages the roller 186 to move the valve 176 to its closed position, thus shutting off the supply of gas to the burner 143 and automatically extinguishing the burner 143.

The burner 143 and the can body which has had its coating flame cured, move together until the can body 27 reaches a position approximately 180 degrees from its entrance position into the turret 22. At this time, the cam track 160 is so shaped that the burner 143 is lowered out of the can body 27. This occurs prior to the movement of the can body 27 away from the turret 22 along the run of the conveyor 23 extending from the turret 22 to the sprocket 61.

Due to the heat generated in the flame curing of the enamel coating, it is desirable that the can body be rapidly cooled. This is accomplished by passing the can body 27 through the chamber 29 wherein cooling air is directed over the can body.

When the can body passes out of the chamber 29, it is cooled to the desired temperature and is stripped from its individual can body holder 26 by the stripping fingers 102 and 103. The can body then passes down the chute 100 and is returned to the can line.

From the foregoing, it will be seen that novel and advantageous provision has been made for carrying out the desired end. However, attention is again directed to the fact that variations may be made in the example apparatus disclosed herein without departing from the spirit and scope of the invention, as defined in the appended claims.

I claim:

1. A flame curing machine for can bodies comprising a rotating turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, and means for operating said flame curing means in timed relation to the rotation of said turret.

2. A flame curing machine for can bodies comprising a rotating turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, means for operating said flame curing means in timed relation to the rotation of said turret, a can discharge station disposed remote from said turret, and a cooling chamber intermediate said turret and said can discharge station, said conveyor passing through said cooling chamber.

3. A flame curing machine for can bodies comprising a rotating turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, and means for operating said flame curing means in timed relation to the rotation of said turret, said operating means including no can-no flame control means fixedly mounted adjacent the path of can bodies and actuated by the presence of a can body.

4. A flame curing machine for can bodies comprising a rotating turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, and means for operating said flame curing means in timed relation to the rotation of said turret, said flame curing means including a burner, said operating means including means for positioning said burner within a can and retracting said burner from within the can, a gas supply, a valve controlling the supplying of gas to said burner, first valve operating means for opening said valve, and second valve operating means for closing said valve.

5. The flame curing machine of claim 4 wherein means are provided for adjustably positioning said second valve operating means to control the burning period of said burner.

6. The flame curing machine of claim 4 wherein said first valve operating means is controlled by a no can-no valve opening type of device fixedly mounted adjacent the path of can bodies and actuated by the presence of a can body.

7. The flame curing machine of claim 4 wherein said first valve operating means is controlled by a no can-no valve opening device including an electrical sensing device for sensing the existence of a can body in an associated can holder.

8. The flame curing machine of claim 4 wherein said first and second valve operating means are offset and said valve including a pair of offset control arms with each of said control arms being engageable by a respective one of said valve operating means.

9. The flame curing machine of claim 4 wherein said first valve operating means includes a cam normally positioned in a valve operating position, and means for retracting said first valve operating means when no can is present, said last mentioned means including an electrically operated drive member controlled by a normally closed sensing device, said sensing device being retained in its normally closed position by the existence of a can body in an associated can body holder.

10. The flame curing machine of claim 4 wherein said first valve operating means includes a cam normally positioned in a valve operating position, and means for retracting said first valve operating means when no can is present, said last mentioned means including an electrically operated drive member controlled by a normally closed sensing device, said sensing device being retained in its normally closed position by the existence of a can body in an associated can body holder, a control switch in series with said sensing device, and means at each station for closing said control switch when a can holder is aligned with said sensing device.

11. The flame curing machine for claim 4 wherein said first valve operating means includes a cam normally positioned in a valve operating position, and means for retracting said first valve operating means when no can is present, said last mentioned means including an electrically operated drive member controlled by a normally closed sensing device, said sensing device being retained in its normally closed position by the existence of a can body in an associated can body holder, a magnetic control switch in series with said sensing device, and a magnet at each of said turret stations for closing said control switch when a can holder is aligned with said sensing device.

12. A flame coring machine for can bodies comprising a turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, and means for operating said flame curing means in timed relation to the rotation of said turret, said flame curing means including a burner, said operating means including means for positioning said burner within a can and retracting said burner from within the can, a gas supply, a valve controlling the supplying of gas to said burner, first valve operating means for opening said valve, and second valve operating means for closing said valve, said burner having a support in the form of a rotating union, a drive pulley on each of said burners, a drive belt extending about a portion of the periphery of said turret and engaged by said drive pulley in the elevated position of said burner for rotating said burner.

13. A flame curing machine for can bodies comprising a turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, and means for operating said flame curing means in timed relation to the rotation of said turret, said flame curing means including a burner, said operating means including means for positioning said burner within a can and retracting said burner from within the can, a gas supply, a valve controlling the supplying of gas to said burner, first valve operating means for opening said valve, and second valve operating means for closing said valve, said second valve operating means including a track extending about a portion of the periphery of said turret, a valve operating member mounted on said track for movement about said turret, and positioning means connected to said valve operating member.

14. The flame curing machine of claim 13 wherein said positioning means includes an endless feed member, and a drive unit connected to said feed member.

15. A flame curing machine for can bodies comprising a rotating turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, and means for operating said flame curing means in timed relation to the rotation of said turret, each of said can body holders including upper and lower can body engaging portions spaced apart a distance substantially equal to the length of the can body to be supported whereby only the flanged end of the can body will be engaged to minimize heat transfer to said can holder.

16. A flame curing machine for can bodies comprising a rotating turret, an endless conveyor passing around said turret and being driven at the same rate, a plurality of can body holders spaced along said conveyor, said turret having a plurality of stations with the spacing of said stations corresponding to the spacing of said can body holders and being synchronized therewith, flame curing means at each of said stations, and means for operating said flame curing means in timed relation to the rotation of said turret, each of said can body holders including upper and lower pairs of circumferentially spaced can body engaging fingers spaced apart a distance substantially equal to the length of the can body to be supported whereby only the flanged end of the can body will be engaged to minimize heat transfer to said can holder, and a recessed magnet disposed intermediate said fingers for holding a can body in engagement with said fingers.

17. The flame curing machine of claim 16 wherein said can body engaging fingers are interchangeably mounted whereby said can body holders may accommodate can bodies of different sizes.

18. A can body holder for use in a flame curing machine, said can body holder comprising a support, upper and lower pairs of circumferentially spaced can body engaging fingers carried by said support and spaced apart a distance substantially equal to the length of the can body to be supported whereby only the flanged end of the can body will be engaged to minimize heat transfer to said can holder, and a recessed magnet disposed intermediate said fingers for holding a can body in engagement with said fingers.

19. A can body holder for use in a flame curing machine, said can body holder comprising a support, upper and lower pairs of circumferentially spaced can body engaging fingers carried by said support and spaced apart a distance substantially equal to the length of the can body to be supported whereby only the flanged end of the can body will be engaged to minimize heat transfer to said can holder, and a recessed magnet disposed intermediate said fingers for holding a can body in engagement with said fingers, said support having a seat for each of said fingers and said fingers being interchangeable whereby can bodies of different sizes may be accommodated.

20. A can body holder for use in a flame curing machine, said can body holder comprising a support, upper and lower pairs of circumferentially spaced can body engaging fingers carried by said support and spaced apart a distance substantially equal to the length of the can body to be supported whereby only the flanged end of the can body will be engaged to minimize heat transfer to said can holder, and a recessed magnet disposed intermediate said fingers for holding a can body in engagement with said fingers, said support having a seat for each of said fingers and said fingers being interchangeable whereby can bodies of different sizes may be accommodated, certain of said fingers being generally L-shaped and being reversible to accommodate two sizes of can bodies.

21. A flame curing machine for can bodies comprising an endless conveyor having a plurality of can holders spaced therealong, a plurality of flame curing stations, means mounting said flame curing stations for movement in unison with associated ones of said can holders along a portion of the path of movement of said can holders, a burner at each of said stations for projection into a can body, and means for projecting said burners into can bodies and operating said burners within the can bodies in timed relation to the movement of said flame curing stations.

22. A flame curing machine for can bodies comprising an endless conveyor having a plurality of can holders spaced therealong, a plurality of flame curing stations, means mounting said flame curing stations for movement in unison with associated ones of said can holders along a portion of the path of movement of said can holders, flame curing means at each of said stations, and means for operating said flame curing means in timed relation to the movement of said flame curing stations, said operating means including no can-no flame control means fixedly mounted adjacent the path of can bodies and actuated by the presence of a can body.

23. A flame curing machine for can bodies comprising an endless conveyor having a plurality of can holders spaced therealong, a plurality of flame curing stations, means mounting said flame curing stations for movement in unison with associated ones of said can holders along a portion of the path of movement of said can holders, flame curing means at each of said stations, and means for operating said flame curing means in timed relation to the movement of said flame curing stations, said flame curing means including a burner, said operating means including means for positioning said burner within a can and retracting said burner from within the can, a gas supply, a valve controlling the supplying of gas to said burner, first valve operating means for opening said valve, and second valve operating means for closing said valve.

24. The flame curing machine of claim 23 wherein means are provided for adjustably positioning said second valve operating means to control the burning period of said burner.

25. The flame curing machine of claim 23 wherein said first valve operating means is controlled by a no can-no valve opening type of device including a sensing device for sensing the existence of a can body in an associated can holder.

26. A flame curing machine for can bodies comprising an endless conveyor having a plurality of can holders spaced therealong, a plurality of flame curing stations, means mounting said flame curing stations for movement in unison with associated ones of said can holders along a portion of the path of movement of said can holders, flame curing means at each of said stations, and means for operating said flame curing means in timed relation to the movement of said flame curing stations, said flame curing means including a burner, said operating means including means for positioning said burner within a can and retracting said burner from within the can, a gas supply, a valve controlling the supplying of gas to said burner, first valve operating means for opening said valve, and second valve operating means for closing said valve, said burner having a support in the form of a rotating union, a drive pulley on each of said burners, a drive belt extending about a portion of the periphery of said turret and engaged by said drive pulley in the elevated position of said burner for rotating said burner.

27. A flame curing machine for can bodies comprising an endless conveyor having a plurality of can holders spaced therealong, a plurality of flame curing stations, means mounting said flame curing stations for movement in unison with associated ones of said can holders along a portion of the path of movement of said can holders, flame curing means at each of said stations, and means for operating said flame curing means in timed relation to the movement of said flame curing stations, said flame curing means including a burner, said operating means including means for positioning said burner within a can and retracting said burner from within the can, a gas supply, a valve controlling the supplying of gas to said burner, first valve operating means for opening said valve, and second valve operating means for closing said valve, said second valve operating means including a track extending about a portion of the periphery of said turret, a valve operating member mounted on said track for movement about said turret, and positioning means connected to said valve operating member.

28. A flame curing machine for can bodies comprising an endless conveyor having a plurality of can holders spaced therealong, a plurality of flame curing stations, means mounting said flame curing stations for movement in unison with associated ones of said can holders along a portion of the path of movement of said can holders, flame curing means including a burner at each of said stations, and means for operating said flame curing means to project the burners thereof into can bodies and effect the operation of said burners while within said can bodies in timed relation to the movement of said flame curing stations, each of said can body holders including upper and lower can body engaging portions spaced apart a distance substantially equal to the length of the can body to be supported whereby only the flanged end of the can body will be engaged to minimize heat transfer to said can holder.

29. A flame curing machine for can bodies comprising an endless conveyor having a plurality of can holders spaced therealong, a plurality of flame curing stations, means mounting said flame curing stations for movement in unison with associated ones of said can holders along a portion of the path of movement of said can holders, flame curing means at each of said stations, and means for operating said flame curing means in timed relation to the movement of said flame curing stations, each of said can body holders including upper and lower pairs of circumferentially spaced can body engaging fingers spaced apart a distance substantially equal to the length of the can body to be supported whereby only the flanged end of the can body will be engaged to minimize heat transfer to said can holder, and a recessed magnet disposed intermediate said fingers for holding a can body in engagement with said fingers.

References Cited in the file of this patent

UNITED STATES PATENTS

| | | |
|---|---|---|
| 828,865 | Spain | Aug. 14, 1906 |
| 874,639 | Taylor | Dec. 24, 1907 |
| 1,445,093 | Lindahl | Feb. 13, 1923 |
| 2,605,091 | Socke | July 29, 1952 |
| 2,848,213 | Bloom et al. | Aug. 19, 1958 |